United States Patent [19]
Cai et al.

[11] Patent Number: 5,831,561
[45] Date of Patent: Nov. 3, 1998

[54] SYSTEM AND METHOD FOR DYNAMICALLY OPTIMIZING A SYMBOL TABLE AND MODEM EMPLOYING THE SAME

[75] Inventors: Lujing Cai, Tinton Falls; Herbert B. Cohen, Morganville; Nuri Ruhi Dagdeviren, Red Bank, all of N.J.

[73] Assignee: Lucent Technologies Inc., Murray Hill, N.J.

[21] Appl. No.: 841,181

[22] Filed: Apr. 29, 1997

[51] Int. Cl.⁶ ...................................................... H03M 3/00
[52] U.S. Cl. ............................................ 341/106; 375/222
[58] Field of Search ............................... 341/106, 51, 76, 341/67, 107, 144, 155; 375/222

[56] References Cited

U.S. PATENT DOCUMENTS 4,862,167  8/1989  Copeland ................................ 341/107
5,663,721  9/1997  Rossi ......................................... 341/51

Primary Examiner—Brian K. Young

[57] ABSTRACT

For use with an analog communications device coupled to an analog interface of a digital telecommunications network, the analog interface having signal conversion values corresponding to an n-level symbol table, a system and method that dynamically selects a constellation of symbols from the n-level symbol table, and a modulator/demodulator ("modem") employing the system or the method. The system includes (1) a logic circuit that selects m symbols, m being less than or equal to n, from the n-level symbol table, the m symbols being a function of the signal conversion values, and (2) a transmission circuit adapted to transmit data identifying the m symbols to a remote device digitally-coupled to the digital telecommunications network, the data allowing the analog communications device and the remote device to communicate with a common symbol table dynamically adapted to the signal conversion values of the analog interface of the digital telecommunications network.

30 Claims, 5 Drawing Sheets

FIG. 2

| NUMBER OF VOLTAGE LEVELS | BITS PER LEVEL (SYMBOL) | DATA RATE (bps) |
|---|---|---|
| 2 | 1 | 8,000 |
| 4 | 2 | 16,000 |
| 8 | 3 | 24,000 |
| 16 | 4 | 32,000 |
| 32 | 5 | 40,000 |
| 64 | 6 | 48,000 |
| 128 | 7 | 56,000 |
| 256 | 8 | 64,000 |

SYSTEM AND METHOD FOR DYNAMICALLY OPTIMIZING A SYMBOL TABLE AND MODEM EMPLOYING THE SAME

TECHNICAL FIELD OF THE INVENTION

The present invention is directed, in general, to data communications and, more specifically, to a system and method for dynamically optimizing a symbol table and a modulator/demodulator ("modem") employing the system or the method.

BACKGROUND OF THE INVENTION

The general availability of public access to the Internet has fueled the proliferation of online information services. Virtually every conceivable type of information can now be found "online," including text, graphics, audio, and even full-motion video. The ability to receive, or transmit, the different types of data, however, is often limited by the inability of the network, or a user's modem, to receive or transmit the data at a sufficiently fast enough rate.

For most users, access to the Internet is accomplished by using a modem connected to the public switched telephone network ("PSTN"). Because the original PSTN was an analog system, conventional modems have used analog methods to communicate with remote systems coupled to the PSTN. The original analog PSTN, however, is increasingly being replaced by a digital network. In most regions, the only remaining portions of the network that use analog transmission are the subscriber, or "local," loops that connect each user to a central office ("CO"); each CO using a digital network to communicate with other COs and, more and more, to communicate with central site (e.g., Internet service provider) devices (e.g., digital "modems") connected to the PSTN via a digital connection. Conventional analog modems, however, view the entire PSTN as an analog system, even though the signals are digitized for transmission throughout most of the network.

When a user calls a central site digitally-connected modem, the analog signals transmitted by the client (i.e. user's) modem are digitized by an analog-to-digital converter ("ADC") in an analog interface to a digital portion of the PSTN. In the United States and Japan, the ADC uses a "mu-law" quantization algorithm, named for the technique used to space the analog-to-digital sample points; in Europe, a different quantization technique, called "A-law," is typically used. Both mu-law and A-law are signal compression algorithms, used in digital communications systems to optimize, i.e. modify, the dynamic range of an analog signal prior to digitization.

Mu-law (and A-law) compression is used to optimize the PSTN for traditional voice communications. The wide dynamic range of speech does not lend itself well to efficient linear digital encoding. Mu-law encoding, however, effectively reduces the dynamic range of the signal, thereby increasing the coding efficiency and resulting in a signal-to-distortion ratio that is greater than that obtained by linear encoding. By artificially limiting the sound spectrum to the bandwidth of normal human speech, the network bandwidth required for each call is reduced, thereby increasing the number of potential simultaneous calls. Although this approach works well for voice communications, it imposes significant limitations on data communications.

When a client modem transmits data, it uses a digital-to-analog converter ("DAC") to convert the digital signal into an analog signal. The analog signal is then received and converted back to digital form by an ADC in the PSTN. If the analog signaling levels used by the DAC in the client modem do not accurately correspond to the quantization intervals used by the ADC in the PSTN, however, the transmitted data may not be converted properly back to digital form by the ADC. If the ADC incorrectly converts an analog signal transmitted by the client modem, the central site modem will not receive the same data that was transmitted, resulting in communications errors. In some cases, error-checking protocols can detect a communication error and direct the client modem to retransmit the corrupted data. The need to periodically retransmit data, however, can greatly reduce the average data transmission rate, thereby limiting a user's ability to efficiently transmit data.

Conventional analog modems use a "symbol" table containing digital bit patterns that correspond to each signaling level or quantization interval. As data is transmitted by a client modem, specific bit patterns within the data stream are correlated to different symbols, each different symbol causing a DAC in the client modem to transmit a unique analog signal to the PSTN. In order for a central site modem to accurately receive the transmitted data, however, the ADC in the PSTN must convert the analog signals received from the client modem back into the original digital bit patterns.

U.S. patent [application Ser.] No. 08/829,274, entitled SYSTEM AND METHOD FOR ITERATIVELY DETERMING QUANTIZATION INTERVALS OF A REMOTE ADC AND MODEM EMPLOYING THE SAME, commonly assigned with the present invention and incorporated herein by reference as if reproduced herein in its entirety, discloses a system and method for determining the actual quantization intervals of an ADC in an analog interface to the PSTN, and a modem employing the same. By determining the quantization intervals of an ADC in an analog interface to the PSTN, a client modem can improve the accuracy of data transmission, via that analog interface, by setting the analog signaling levels of its DAC to correspond to the actual, rather than ideal, quantization intervals of the ADC. The principles of the present invention, however, are not limited to a particular means or method for determining the actual quantization intervals of a remote ADC, or the actual signaling levels of a remote DAC; the principles of the present invention are directed to dynamically selecting a symbol table that is optimized with respect to predetermined actual quantization intervals and signaling levels.

The symbol tables conventionally used by analog modems are static; i.e. the signaling levels of the DAC in a client modem are not configurable as a function of the quantization intervals used by an ADC in the PSTN, but are predetermined based on the ideal reference values defined, for example, by the mu-law standard (ITU Recommendation G.711). Because the actual quantization intervals of each mu-law ADC in the PSTN are not equal, but typically deviate from the ideal reference levels, a static symbol table is incapable of always providing an appropriate set, or "constellation," of symbols for optimal data communications.

Accordingly, what is needed in the art is a system and method for dynamically optimizing a symbol table, whereby a modem employing the system or the method can enhance its capability to accurately transmit data to, and receive data from, a remote system digitally-coupled to the PSTN.

SUMMARY OF THE INVENTION

To address the above-discussed deficiencies of the prior art, the present invention provides, for use with an analog communications device coupled to an analog interface of a digital telecommunications network, the analog interface having signal conversion values corresponding to an n-level symbol table, a system and method that dynamically selects a constellation of symbols from the n-level symbol table, and a modulator/demodulator ("modem") employing the system or the method. The system includes (1)a logic circuit that selects m symbols, m being less than or equal to n, from the n-level symbol table, the m symbols being a function of the signal conversion values, and (2) a transmission circuit that transmits data to a remote device digitally-coupled to the digital telecommunications network identifying the m symbols, the data allowing the analog communications device and the remote device to communicate with a common symbol table dynamically adapted to the signal conversion values of the analog interface of the digital telecommunications network. In one embodiment, the m symbols are the symbols in the n-level symbol table that correspond to signal conversion values having the greatest minimum separation between adjacent ones of the signal conversion values.

In one embodiment, the analog interface includes an analog-to-digital converter ("ADC") and the signal conversion values, or "characteristics," are the quantization thresholds that define the quantization intervals of the ADC, each of the quantization intervals corresponding to a symbol in the n-level symbol table. In a related embodiment, the analog interface includes a digital-to-analog converter ("DAC") and the signal conversion values, or "characteristics," are the analog signaling levels of the DAC, each of the analog signaling levels corresponding to a symbol in the n-level symbol table.

The present invention therefore introduces the broad concept of dynamically-adapting a symbol table (i.e., a "constellation" of symbols) to the signal conversion characteristics of an analog interface to a digital telecommunications network. As described in the detailed description that follows, by dynamically-adapting a symbol table to the signal conversion characteristics of an analog interface to a digital telecommunications network, the analog signaling levels used by an analog communications device, such as a modem, can be optimized with respect to the quantization intervals of an ADC in the analog interface, whereby "upstream" communications may be improved; and, similarly, a set of quantization intervals of an ADC in the analog communications device can be selected that are optimized with respect to the analog signaling levels of a DAC in an analog interface to a digital telecommunications network, whereby "downstream" communications may be improved.

BRIEF DESCRIPTION OF THE DRAWINGS

For a more complete understanding of the present invention, and the advantages thereof, reference is now made to the following descriptions taken in conjunction with the accompanying drawings, in which:

FIG. 2 illustrates the required number of analog signaling levels, and corresponding bits per level (i.e., bits per symbol), for different data transmission rates;

DETAILED DESCRIPTION

Figure 1:
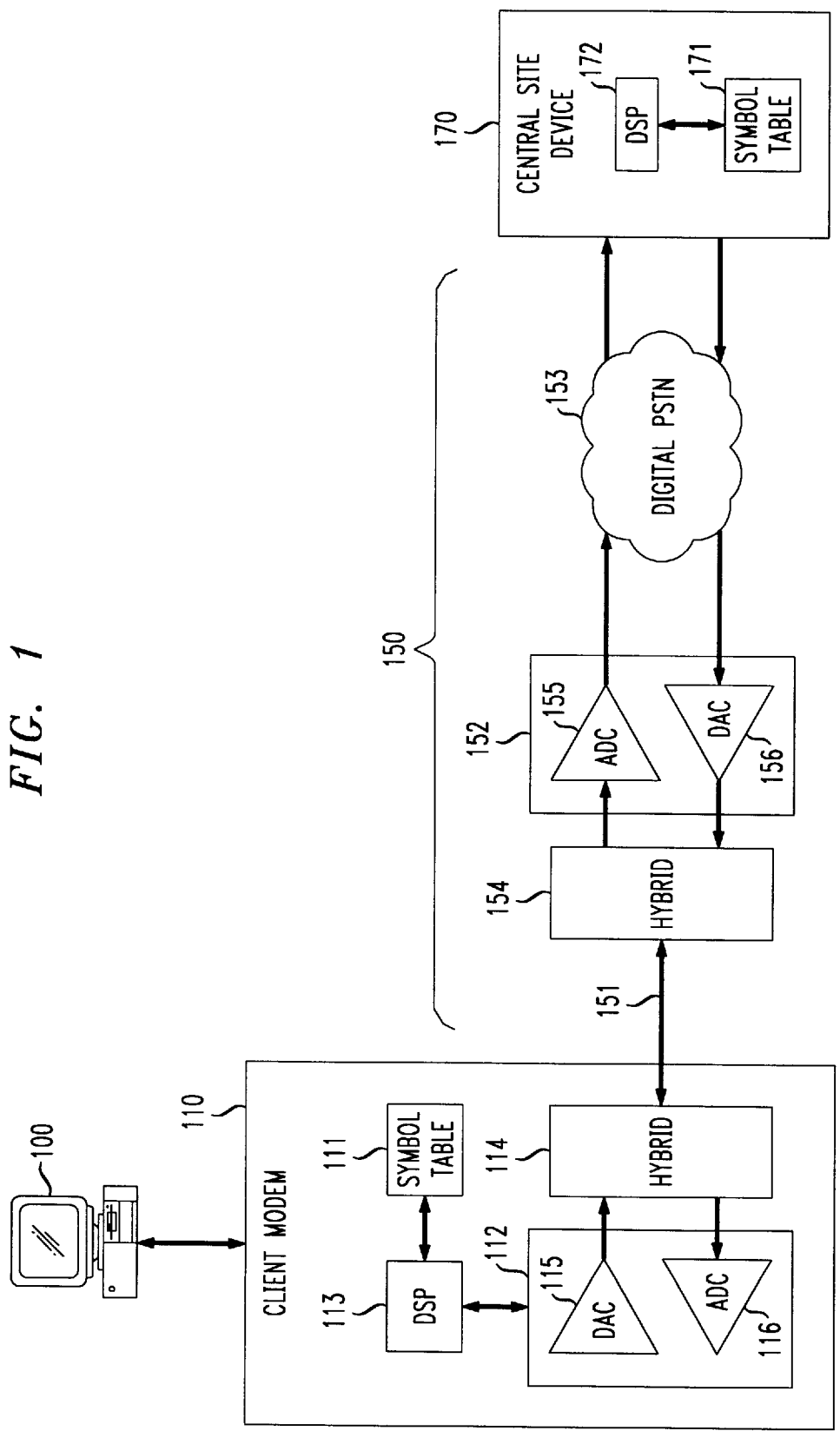
FIG. 1 illustrates a high-level schematic of a client modem communicating with a remote communications device (or "central site device") through a public switched telephone network ("PSTN")

Referring initially to FIG. 1, illustrated is a high-level schematic of a client modem 110 communicating with a remote communications device (or "central site device") 170 through a public switched telephone network ("PSTN") 150. As used herein, "client" generally refers to a device that is coupled to the PSTN via an analog local loop, and "central" generally refers to a device that is digitally-coupled to the PSTN for communicating with one or more client devices. Thus, in FIG. 1, a computer 100 is shown coupled via a client modem 110 to the PSTN 150 for communicating with a central site device 170.

In one embodiment, the client modem 110 includes a digital signal processor ("DSP") 113 and a coder/decoder ("CODEC") 112. The CODEC 112 includes a digital-to-analog converter ("DAC") 115 for converting digital signals to analog signals for transmission over analog local loop 151, and an analog-to-digital converter ("ADC") 116 for converting analog signals received over analog local loop 151 to digital signals. The client modem 110 is coupled to an analog local loop 151 of the PSTN 150 via a hybrid 114. A "hybrid" is a passive device used for converting a dual analog signal (e.g. a conversation between remote telephone users) that is carried on one pair of conductors (i.e. the analog local loop 151) to separate analog signals that are carried on two pairs of conductors. Those skilled in the art are familiar with the use and operation of hybrid devices and, thus, a detailed description thereof is not necessary to enable one of skill in the art to make and practice the present invention.

A conventional analog interface in the PSTN 150 includes a hybrid 154 and a CODEC 152. In one embodiment of the present invention, the CODEC 152 is a mu-law CODEC. Those skilled in the art are familiar with the non-linear mu-law and A-law signal compression algorithms. The mu-law algorithm includes 255 discrete signal conversion values; A-law uses 256 values. The broad principles of the present invention are not, however, limited to a specific quantization scheme. The mu-law CODEC 152 includes an ADC 155 for converting analog signals received from the client modem 110 over analog local loop 151 to digital signals for transmission over a digital portion 153 of the PSTN to the central site device 170, and a DAC 156 for converting digital signals received over digital portion 153 from the central site device 170 to analog signals for transmission over analog local loop 151 to the client modem 110.

The ADC 155 conventionally uses 255 non-uniformly spaced quantization intervals, which are closer together for small analog signal values and spread further apart for large signal values, to convert an analog signal received from the client modem 110 via the analog local loop 151 to one of 255 unique digital bit patterns, or "symbols," for transmission over the digital portion 153 of the PSTN to the central site device 170. Each quantization interval is defined by lower and upper thresholds, i.e., analog voltage levels; the upper threshold for an interval being the lower threshold for the next highest quantization interval. When an analog signal is received by the ADC 155, the signal is converted to a unique symbol corresponding to the quantization interval within which the analog signal value is located. Similarly, the DAC 156 converts a symbol received from the central site device 170 to one of 255 unique analog signaling levels for transmission over the analog local loop 151 to the client modem 110.

As described hereinabove, the client modem 110 is coupled via the PSTN 150 to a central site device 170. To communicate data between the client modem 110 and central site device 170, each device uses a symbol table 111 and 171, respectively. Those skilled in the art are familiar with the use of "symbol tables" to store predefined symbols that can be used to efficiently transmit digital data. In one embodiment, when data is to be transmitted by the client modem 110 to the central site device 170 (ie., "upstream" data), the DSP 113 selects symbols to represent the data from the symbol table 111 and sends the symbols to the DAC 115. The DAC 115 converts the symbols to discrete analog signaling levels which are received and converted back to symbols by the ADC 155 in the analog interface to the PSTN 150, as described hereinabove. In one embodiment, the central site device 170, which may be referred to as a "digital modem," includes a DSP 172 for receiving the symbols from the digital portion 153 of the PSTN 150; the principles of the present invention, however, are not limited to a specific hardware or software implementation of the central site device 170. The central site device 170 also includes a symbol table 171, which is used by the DSP 172 to convert a received symbol back to the data transmitted by client modem 110.

Similarly, when data is to be transmitted by the central site device 170 to the client modem 110 (i.e., "downstream" data), the DSP 172 selects symbols to represent the data from the symbol table 171 and transmits the symbols via the digital portion 153 of the PSTN 150. The symbols are received and converted by the DAC 156 in the analog interface to the PSTN 150 to discrete analog signaling levels, as described hereinabove. The discrete analog signaling levels are then received and converted back to symbols by the ADC 116 in the client modem 110. The DSP 113 in client modem 110 then uses symbol table 111 to convert the received symbol back to the data transmitted by the central site device 170.

The accurate transmission of data from the client modem 110 to the central site device 170, as described hereinabove, assumes that each analog signal transmitted by client modem 110 through the analog local loop 151 is properly reconverted by ADC 155 to the same (digital) symbol that was converted by DAC 115 to the transmitted analog signal. Thus, to ensure the proper transmission of each symbol in the "upstream" direction, the analog signaling levels of DAC 115 must be within the proper quantization intervals of ADC 155, which requires a determination of the actual quantization thresholds for each interval of the ADC 152 in the analog interface to the PSTN 150. Likewise, to ensure the proper transmission of each symbol in the "downstream" direction, the actual analog signaling levels of the DAC 156 in the analog interface to the PSTN 150 must be determined. As used herein, the quantization thresholds of the ADC 155 and the analog signaling levels of the DAC 156 are alternatively referred to as "signal conversion values." In one embodiment of the present invention, the signal conversion values correspond an n-level symbol table; i.e., each unique signal conversion value corresponds to a unique symbol in an n-level symbol table.

U.S. patent Ser. No. 08/829,274, incorporated herein by reference, discloses a system and method whereby the client modem 110 may iteratively determine the quantization intervals of the ADC 155. To determine the analog signaling levels of the DAC 156, a training sequence may be employed, for example, wherein the central site device 170 transmits the 255 symbols corresponding to the 255 mu-law signaling levels of the DAC 156. The DAC 156 converts each of the 255 symbols to an analog signaling level (i.e., voltage) which is received and converted by the ADC 116 in the client modem 110. Those skilled in the art may conceive of other systems and methods for determining the quantization intervals of a remote ADC, or the analog signaling levels of a remote DAC; the principles of the present invention, however, are not limited to a particular system or method for determining the operational characteristics of remote ADCs or DACs.

In one embodiment, each of the quantization intervals of the ADC 155 (and, similarly, the signaling levels of the DAC 156) corresponds to a unique symbol that may be used to transmit data through the PSTN 150. For example, assume that the client modem 110 can transmit only two discrete analog signal levels (e.g., voltages), which can be used to represent two binary values (0 and 1). Whereas the network clock rate (or sampling rate) of the PSTN is 8000 Hz, the client modem 110 could transmit binary data at a rate of 8000 bits per second ("bps"). If the client modem 110 can transmit four discrete analog signal levels, however, two bits (i.e., 00, 01, 10, and 11) may be assigned to each level, allowing the modem to communicate at 16,000 bps (2 bits /sample X 8000 samples/second).

FIG. 2 illustrates the required number of analog signal levels, and corresponding bits per level (i.e., bits per symbol), for different data rates. If the PSTN performed optimally, it would be possible to communicate at 64 Kbps. There are a number of problems, however, that limit the ability of a modem coupled to the PSTN to operate at that speed. For example, in the United States, the digital portion 153 of the PSTN 150 may be a Ti line utilizing "robbed bit signaling" for call progress indication. Robbed bit signaling "steals" the low order sample bit in two of the samples per frame to indicate the status of an incoming (or outgoing)call. The use of this bit by the network means that the central site device 170 cannot always access 8 bits per sample, thus limiting the maximum achievable data rate. Additionally, line noise and other passive and non-linear characteristics of the analog local loop 151 can distort the transmitted signals, which may impair the ability of the ADC 155, and ADC 116, to correctly discriminate between closely-spaced analog signaling levels of DAC 115, and DAC 156, respectively.

Because it is typically not possible to use all of the available signal conversion values, and the symbols corresponding thereto, it is necessary to select a subset of the available symbols. Prior art modems have used predefined (i.e., static) symbol sets (i.e. "constellations") corresponding to combinations of ideal signal conversion values; different symbol sets corresponding to different data transmission rates. Because the actual signal conversion values of a typical ADC 155, or DAC 156, in a mu-law CODEC 152 deviate from the ideal values, however, a predefined constellation may not provide optimal communications. Recognizing that it is possible to determine remotely the actual signal conversion values of an ADC 155 and a DAC 156 in an analog interface to the PSTN 150, the present invention discloses a system and method for dynamically optimizing a constellation (i.e., "symbol table") to minimize the deleterious effect on data communications resulting from deviations in the ideal signal conversion values of the ADC 155 or DAC 156 in the analog interface to the PSTN 150.

Figure 3:
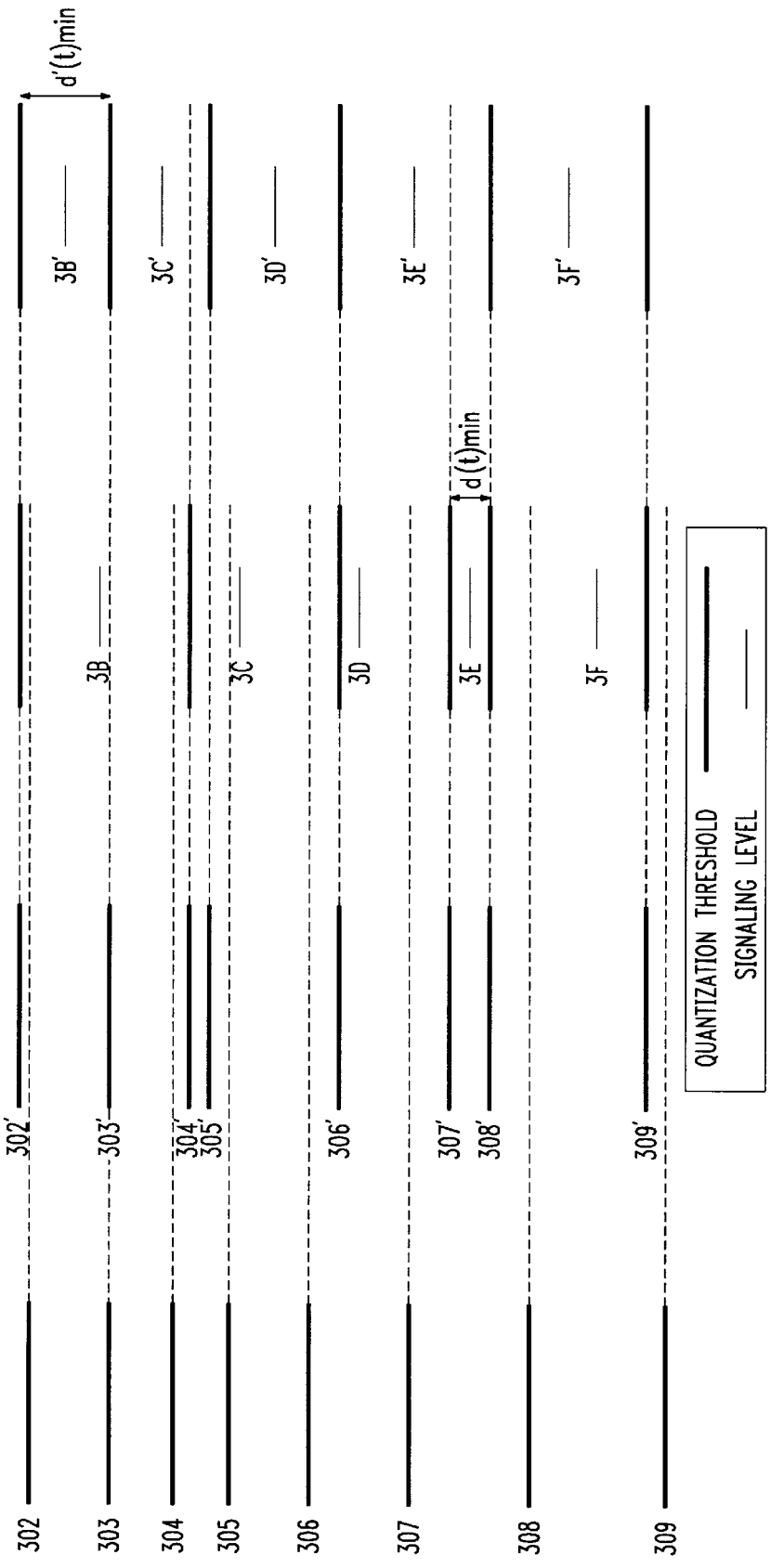
FIG. 3 illustrates exemplary ideal quantization thresholds for an analog-to-digital converter ("ADC") in an analog interface to a PSTN, exemplary actual quantization thresholds for an ADC, an exemplary constellation based on the ideal quantization thresholds, and an exemplary optimal constellation based on the actual quantization thresholds.

Turning now to FIG. 3, illustrated are exemplary ideal quantization thresholds for an ADC 155 in an analog interface to the PSTN 150, exemplary actual quantization thresholds for an ADC 155, an exemplary constellation based on the ideal quantization thresholds, and an exemplary optimal constellation based on the actual quantization thresholds. For the purpose of illustrating the principles of the present invention in the "upstream" direction, a base constellation having only eight (8) levels is used. In practice, however, a base constellation will typically correspond to the 255 mu-law (or 256 A-law) quantization levels (defined by ITU Recommendation G.711). Thus, for purposes of illustration, it is assumed that an ADC 155 in the analog interface to the PSTN 150 is characterized by eight (8) quantization intervals defined by the nine (9) exemplary ideal quantization thresholds 301, 302, 303, 304, 305, 306, 307, 308, and 309 shown in FIG. 3. As noted supra, the mu-law algorithm is non-linear, and thus the separation between adjacent quantization thresholds is non-uniform. As also noted hereinabove, the actual quantization thresholds of an ADC typically deviate from the ideal values. Thus, the quantization thresholds of an ADC 155 may correspond to the exemplary actual quantization thresholds 301', 302', 303', 304', 305', 306', 307', 308', 308', and 309'; as can be seen, the actual quantization thresholds can deviate significantly above or below the ideal values.

As described hereinabove, it is typically not possible to use all of the possible quantization intervals, and thus a subset of those intervals is selected; i.e., a subset of the base constellation of symbols for transmission in the upstream direction is selected. In one embodiment, if an interval is not selected, its quantization interval is combined with an adjacent selected interval to yield a broader quantization interval; i.e., if a symbol corresponding to a non-selected interval is received by the central site device 170, the symbol is treated as though it were the same as the symbol corresponding to the adjacent selected interval. In one embodiment, the intervals are selected from all possible intervals such that the minimum separation between adjacent thresholds $(d(t)_{min})$ is maximized.

For example, assume that a subset consisting of six (6) of the eight (8) intervals illustrated in FIG. 3 is to be selected. Using the ideal quantization thresholds 301 through 309, those skilled in the art will recognize that thresholds 303 and 305 would preferably be eliminated and, thus, a constellation using six of the eight possible intervals would consist of the intervals defined by ideal quantization thresholds 301, 302, 304, 306, 307, 308, and 309. Because the actual quantization thresholds 301', 302', 304', 306', 307', 308', and 309' differ from the ideal values, however, if the selection is made in advance based on the ideal quantization thresholds, it can be seen in FIG. 3 that the resulting constellation may consist of undesirably narrow intervals, such as the interval defined by actual quantization thresholds 307' and 308', which have a separation of "$d(t)_{min}$". In contrast, if the actual quantization thresholds 301' through 309' are used to select the constellation, thresholds 304' and 307' would preferably be eliminated and, thus, a constellation using six of the eight possible intervals would consist of the intervals defined by actual quantization thresholds 301', 302', 303', 305', 306', 308', and 309', yielding a minimum separation between adjacent thresholds of "$d'(t)_{min}$," $d'(t)_{min}$, being greater than $d(t)_{min}$.

To further illustrate the disadvantage of an a priori selection of a constellation, those skilled in the art will recognize that each of the analog signaling levels of the client modem 110 are preferably set to the midpoint of the corresponding quantization interval of the ADC 155; i.e., each signal voltage is midway between the upper and lower threshold values of the corresponding quantization interval. Thus, as illustrated in FIG. 3, if the ideal quantization thresholds are used, the analog signaling levels would correspond to levels 3A, 3B, 3C, 3D, 3E, and 3F, which are each midway between the ideal quantization thresholds 301–302, 302–304, 304–306, 306–307, 307–308, and 308–309, respectively. Because the actual quantization thresholds 301', 302', 304', 306', 307', 308', and 309' differ from the ideal values, however, it can be seen that the signal levels 3A through 3F do not correspond to the actual midpoints of the respective intervals. In contrast, if the actual quantization thresholds 301' through 309' are used to select the constellation and for setting the analog signaling levels of the client modem 110, the analog signaling levels would correspond to levels 3A', 3B', 3C', 3D', 3E', and 3F', which are each midway between the actual quantization thresholds 301'–302', 302'–303', 303'–305', 305'–306', 306'–308', and 308'–309', respectively.

Figure 4:
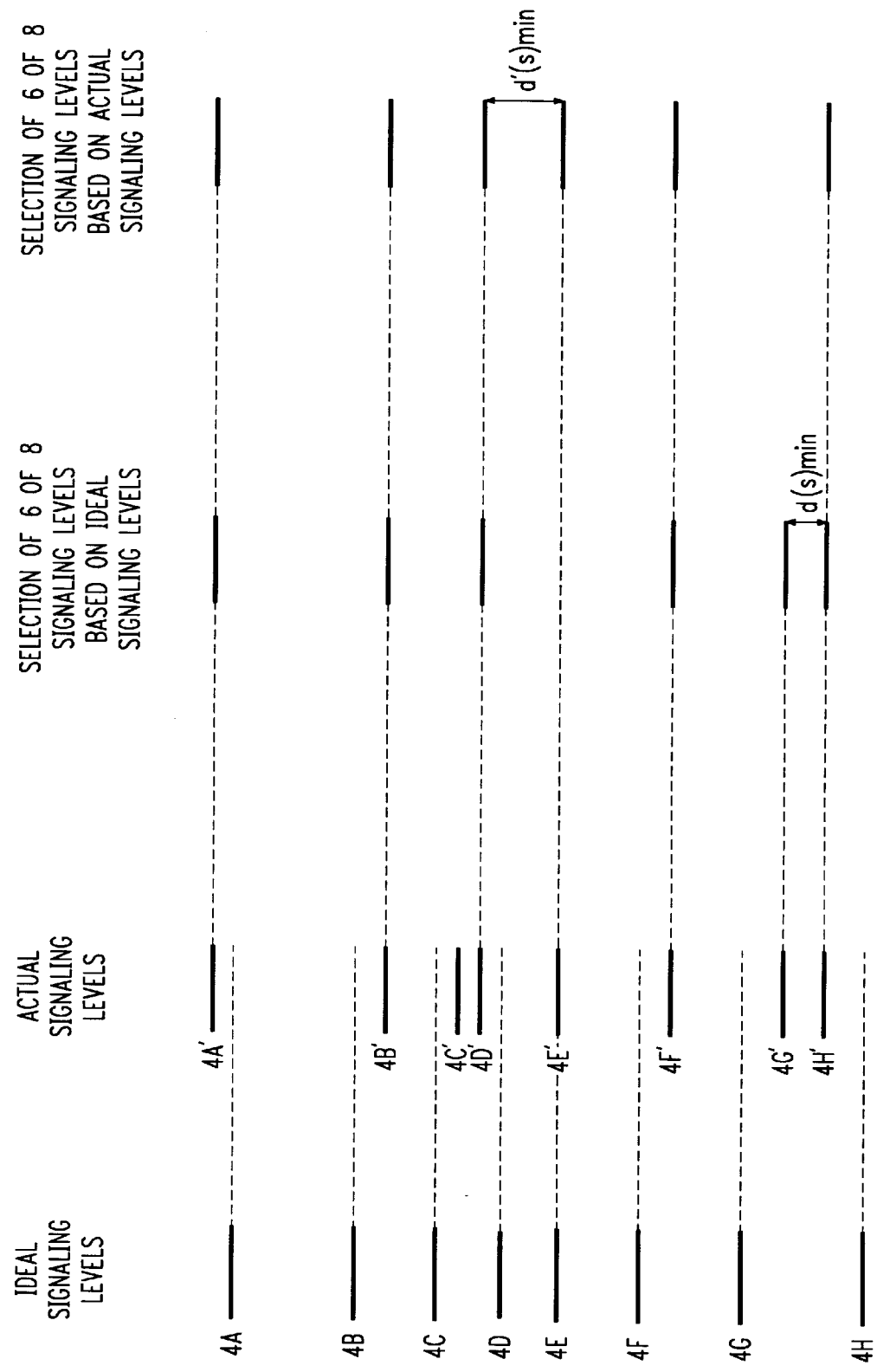
FIG. 4 illustrates exemplary ideal signaling levels for a digital-to-analog converter ("DAC") in an analog interface to a PSTN, exemplary actual signaling levels for a DAC, an exemplary constellation based on the ideal signaling levels, and an exemplary optimal constellation based on the actual signaling intervals.

Turning now to FIG. 4, illustrated are exemplary ideal signaling levels 4A, 4B, 4C, 4D, 4E, 4F, 4G, and 4H for a digital-to-analog converter ("DAC") in an analog interface to a PSTN, exemplary actual signaling levels 4A', 4B', 4C', 4D', 4E', 4F', 4G', and 4H' for a DAC, an exemplary constellation based on the ideal signaling levels, and an exemplary optimal constellation based on the actual signaling intervals. For the purpose of illustrating the principles of the present invention in the "downstream" direction, a base constellation having only eight (8) levels is used. In practice, however, a base constellation will typically correspond to the 255 mu-law (or 256 A-law) levels (defined by ITU Recommendation G.711). Thus, for purposes of illustration, it is assumed that a DAC 156 in the analog interface to the PSTN 150 is characterized by the eight (8) exemplary ideal signaling levels 4A, 4B, 4C, 4D, 4E, 4F, 4G, and 4H shown in FIG. 4. As noted supra, the mu-law algorithm is non-linear, and thus the separation between adjacent signaling levels is non-uniform. As also noted hereinabove, the actual signaling levels of a DAC typically deviate from the ideal values. Thus, the actual signaling levels of a DAC 156 may correspond to the exemplary actual signaling levels 4A', 4B', 4C', 4D', 4E', 4F', 4G', and 4H'; as can be seen, the actual signaling levels can deviate significantly above or below the ideal values.

As described hereinabove, it is typically not possible to use all of the possible signaling levels, and thus a subset of those levels is selected; i.e., a subset of the base constellation of symbols for transmission in the downstream direction is selected. In one embodiment, the signaling levels are selected from all of the possible signaling levels such that the minimum separation between adjacent levels is maximized.

For example, assume that a subset consisting of six (6) of the eight (8) signaling levels illustrated in FIG. 4 is to be selected. Using the ideal signaling levels 4A through 4H, those skilled in the art will recognize that levels 4C and 4E would preferably be eliminated and, thus, a constellation using six of the eight possible signaling levels would consist of the levels defined by ideal signaling levels 4A, 4B, 4D, 4F, 4G, and 4H. Because the actual signaling levels 4A', 4B', 4C', 4D', 4E', 4F', 4G', and 4H' differ from the ideal values, however, if the selection is made in advance based on the ideal signaling levels, it can be seen in FIG. 4 that the resulting constellation may consist of some closely-spaced signaling levels, such as that between actual signaling levels 4G' and 4H', which have a separation of "$d(s)_{min}$." In contrast, if the actual signaling levels 4A' through 4H' are used to select the constellation, signaling levels 4C' and 4G' would preferably be eliminated and, thus, a constellation using six of the eight possible signaling levels would consist of the levels defined by actual signaling levels 4A', 4B', 4D', 4E', 4F', and 4H', yielding a minimum separation between adjacent levels of "$d'(s)_{min}$." $d'(s)_{min}$ being greater than $d(s)_{min}$.

The constellation selection process, for both the "upstream" and "downstream" directions, can be approached as a combinatorial optimization problem which can be solved using a variety of techniques; the principles of the present invention, however, are not limited to a specific method of dynamically-adapting a constellation to the actual signal conversion characteristics of an analog interface to the PSTN 150. In one embodiment, the observed (i.e. actual) signal conversion values (e.g., quantization thresholds of the ADC 155 in the "upstream" direction, or signaling levels of the DAC 156 in the "downstream" direction) in the base constellation are labeled as $X_i(i=1,n)$ and ordered such that $X_i \leq X_j$ for $i \leq j$. The objective is to select m of these levels $X_j(j=1,m)$, such that the minimum difference (i.e., separation between adjacent values) $dj=|X_{j+1}-X_j|$ is the maximum possible value. Beginning with a base constellation including all n levels $X_n$, a constellation having n−1 levels is determined by:

1. identifying j such that $d_j$ is minimized; and
2. eliminating $X_j$ if $d_{j-1}<d_{j+1}$; otherwise eliminating $X_{j+1}$ The process can be repeated n−m times to arrive at a constellation, with m levels, having the maximum possible minimum separation between adjacent values.

In order for the client modem 110 and central site device 170 to communicate using a common symbol table, after the actual signal conversion values of the ADC 155 and DAC 156 are determined and optimal constellations for the "upstream" and "downstream" directions are selected based on those values, respectively, the client modem 110 transmits the optimal constellations to the central site device 170. In one embodiment, a bit-mapped field, identifying the m symbols that have been selected from each of the upstream and downstream base constellations, is transmitted by the client modem 110 to the central site device 170.

Figure 5:
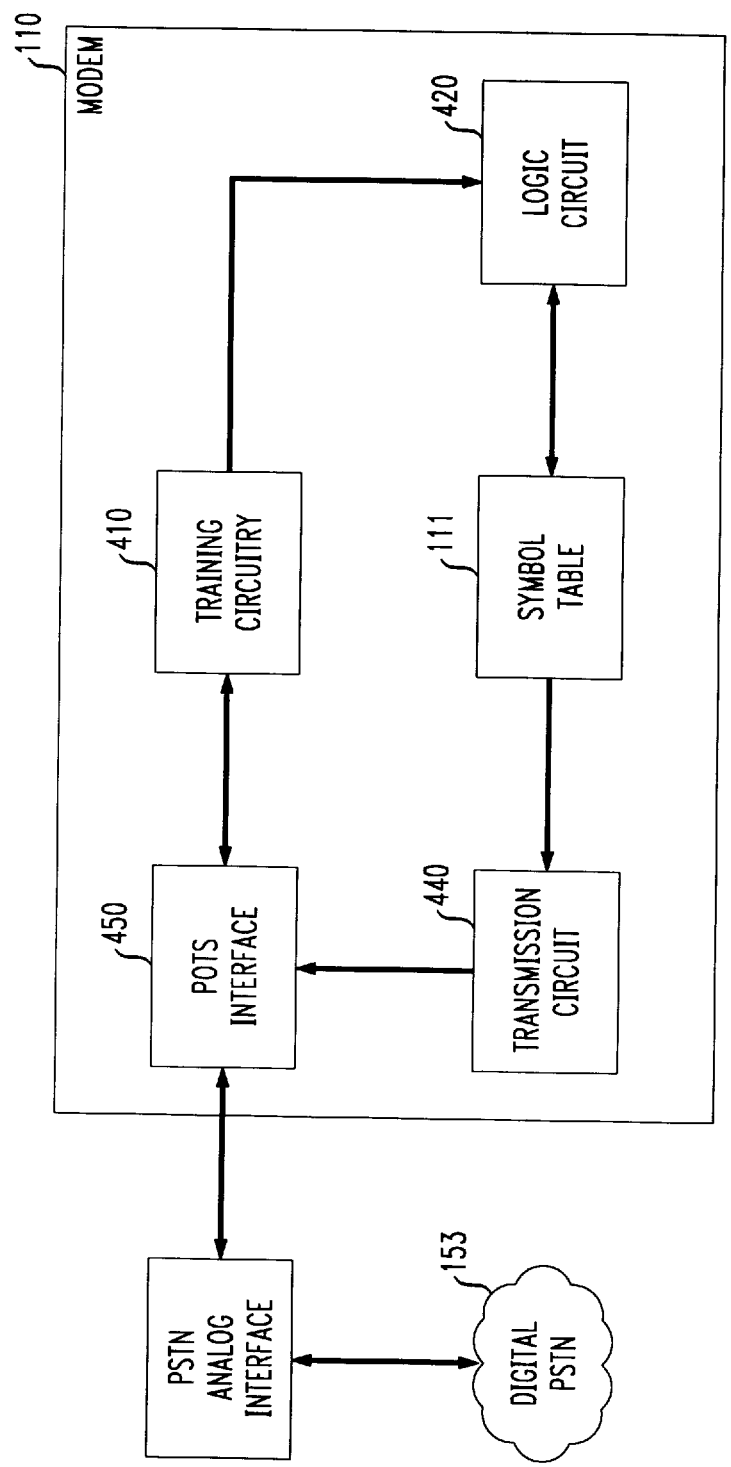
FIG. 5 illustrates an exemplary functional schematic of a modem employing the principles of the present invention.

Turning now to FIG. 5, illustrated is an exemplary functional schematic of a client modem 110 employing the principles of the present invention. Although a modem is a conventional device used for data communications via the PSTN 150, other devices may employ the principles of the present invention to advantage; the principles of the present invention are not limited to a specific communications device. The client modem 110 includes a telephone interface 450 for coupling the modem to the PSTN 150; training circuitry 410, as described supra, for determining the signal conversion values of an ADC 155 and DAC 156 in the analog interface to the PSTN 150; a symbol table 111 for storing constellation of symbols for the upstream and downstream channels; a logic circuit 420 for selecting optimal constellations from base constellations; and a transmission circuit 440 that is adapted to transmit the optimal constellations to a central site device 170. Although the modem 110 is illustrated as including discrete circuits for each function, those skilled in the art will recognize that a modem employing the principles of the present invention may be integrated into one or more semiconductor devices including, without limitation, digital signal processors ("DSP"), microprocessors ("μp"), application specific integrated circuits ("ASIC"), and programmable read-only memorys ("PROM").

When a system employing modem 110 connects to a central site device 170, the training circuitry 410 is operative to determine the signal conversion values of the ADC 155 and DAC 156 in the analog interface to the PSTN 150, the signal conversion values corresponding to an n-level symbol table of a base constellation. The base constellation may be stored in symbol table 111, which is accessible to logic circuit 420.

Logic circuit 420 is suitably operative to select an optimal constellation, as described supra, and modify the symbol table 111 to reflect the m symbols of an optimal constellation. In one embodiment of the present invention, the logic circuit is embodied in a sequence of executable software instructions, and is operative to select an optimal constellation (e.g., an m-level symbol table) from a base constellation (e.g., an n-level symbol table, $n \geq m$) consisting of symbols corresponding to the signal conversion values of the CODEC 152. Those skilled in the art are familiar with the use of software to process digital information and control the operating characteristics of electronic hardware, and will thus appreciate the advantages of implementing the logic circuit in software.

Transmission circuit 240 is operative to read symbol table 111 and adapted to transmit a bit-mapped field that identifies the m symbols in an optimal constellation to the central site device 170, whereby the modem 110 and central site device 170 may use a common symbol table dynamically-adapted to the signal conversion values of the analog interface of the PSTN 150. Those skilled in the art will recognize other possible means of transmitting the optimal constellation data to the central site device 170; the broad principles of the present invention including all such means.

The foregoing has described preferred and alternative features of the present invention that form the subject of the following claims. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

What is claimed is:

1. For use with an analog communications device coupled to an analog interface of a digital telecommunications network, said analog interface having signal conversion values corresponding to symbols in an n-level symbol table, a system that dynamically selects a constellation of said symbols from said n-level symbol table, comprising:

a logic circuit that selects m symbols, m being less than or equal to n, from said n-level symbol table, said m symbols being a function of said signal conversion values; and a transmission circuit adapted to transmit data identifying said m symbols to a remote device digitally-coupled to said digital telecommunications network, whereby said analog communications device and said remote device may communicate with a common symbol table dynamically adapted to said signal conversion values of said analog interface of said digital telecommunications network.

2. The system as recited in claim 1 wherein said analog interface comprises an analog-to-digital converter (ADC) and said signal conversion values are quantization thresholds that define quantization intervals of said ADC, each of said quantization intervals corresponding to a symbol in said n-level symbol table.

3. The system as recited in claim 1 wherein said analog interface comprises a digital-to-analog converter (DAC) and said signal conversion values are analog signaling levels of said DAC, each of said analog signaling levels corresponding to a symbol in said n-level symbol table.

4. The system as recited in claim 1 wherein said m symbols are the symbols in said n-level symbol table that correspond to signal conversion values having the greatest minimum separation between adjacent ones of said signal conversion values.

5. The system as recited in claim 1 wherein said signal conversion values are non-linearly distributed.

6. The system as recited in claim 5 wherein said signal conversion values are distributed according to mu-law.

7. The system as recited in claim 5 wherein said signal conversion values are distributed according to A-law.

8. The system as recited in claim 1 wherein said data are arranged in a bitmap.

9. The system as recited in claim 1 wherein said logic circuit and said transmission circuit are associated with a modulator/demodulator (modem).

10. The system as recited in claim 1 wherein said logic circuit is embodied in a sequence of executable software instructions.

11. For use with an analog communications device coupled to an analog interface of a digital telecommunications network, said analog interface having signal conversion values corresponding to symbols in an n-level symbol table, a method that dynamically selects a constellation of said symbols from said n-level symbol table, comprising:

selecting m symbols, m being less than or equal to n, from said n-level symbol table, said m symbols being a function of said signal conversion values; and transmitting data identifying said m symbols to a remote device digitally-coupled to said digital telecommunications network, whereby said analog communications device and said remote device may communicate with a common symbol table dynamically adapted to said signal conversion values of said analog interface of said digital telecommunications network.

12. The method as recited in claim 11 wherein said analog interface comprises an analog-to-digital converter (ADC) and said signal conversion values are quantization thresholds that define quantization intervals of said ADC, each of said quantization intervals corresponding to a symbol in said n-level symbol table.

13. The method as recited in claim 11 wherein said analog interface comprises a digital-to-analog converter (DAC) and said signal conversion values are analog signaling levels of said DAC, each of said analog signaling levels corresponding to a symbol in said n-level symbol table.

14. The method as recited in claim 11 wherein said step of selecting comprises the steps of:

determining separations between adjacent ones of said signal conversion values; and selecting m symbols from the symbols in said n-level symbol table that correspond to signal conversion values having the greatest minimum separation between said adjacent ones of said signal conversion values.

15. The method as recited in claim 11 wherein said signal conversion values are non-linearly distributed.

16. The method as recited in claim 15 wherein said signal conversion values are distributed according to mu-law.

17. The method as recited in claim 15 wherein said signal conversion values are distributed according to A-law.

18. The method as recited in claim 11 wherein said step of transmitting comprises the step of arranging said data in a bitmap.

19. The method as recited in claim 11 wherein said steps of selecting and transmitting are performed in a modulator/demodulator (modem).

20. The method as recited in claim 14 wherein said steps of determining separations and deleting are performed by executing a sequence of software instructions.

21. A modulator/demodulator (modem), comprising:

a telephone interface that allows said modem to be coupled to an analog interface of a digital telecommunications network;

training circuitry that allows said modem to determine signal conversion values of said analog interface, said signal conversion values uniquely corresponding to symbols in an n-level symbol table;

a logic circuit that selects m symbols, m being less than or equal to n, from said n-level symbol table, said m symbols being a function of said signal conversion values; and a transmission circuit adapted to transmit data identifying said m symbols to a remote device digitally-coupled to said digital telecommunications network, whereby said analog communications device and said remote device may communicate with a common symbol table dynamically adapted to said signal conversion values of said analog interface of said digital telecommunications network.

22. The modem as recited in claim 21 wherein said analog interface comprises an analog-to-digital converter (ADC) and said signal conversion values are quantization thresholds that define quantization intervals of said ADC, each of said quantization intervals corresponding to a symbol in said n-level symbol table.

23. The modem as recited in claim 21 wherein said analog interface comprises a digital-to-analog converter (DAC) and said signal conversion values are analog signaling levels of said DAC, each of said analog signaling levels corresponding to a symbol in said n-level symbol table.

24. The system as recited in claim 21 wherein said m symbols are the symbols in said n-level symbol table that correspond to signal conversion values having the greatest minimum separation between adjacent ones of said signal conversion values.

25. The modem as recited in claim 21 wherein said signal conversion values are non-linearly distributed.

26. The modem as recited in claim 25 wherein said signal conversion values are distributed according to mu-law.

27. The modem as recited in claim 25 wherein said signal conversion values are distributed according to A-law.

28. The modem as recited in claim 21 wherein said data are arranged in a bitmap.

29. The modem as recited in claim 21 wherein said remote device comprises a digital signal processor (DSP).

30. The modem as recited in claim 21 wherein said logic circuit is embodied in a sequence of executable software instructions.

* * * * *